United States Patent [19]

Aratani

[11] Patent Number: 5,357,494
[45] Date of Patent: Oct. 18, 1994

[54] MAGNETO-OPTICAL PLAYBACK METHOD

[75] Inventor: Katsuhisa Aratani, Chiba, Japan

[73] Assignee: Sony Corporation, Tokyo, Japan

[21] Appl. No.: 175,693

[22] Filed: Dec. 30, 1993

Related U.S. Application Data

[63] Continuation of Ser. No. 578,434, Sep. 7, 1990, abandoned.

[30] Foreign Application Priority Data

Sep. 8, 1989 [JP] Japan .................. 1-233601

[51] Int. Cl.$^5$ .................. G11B 11/12; G11B 13/04
[52] U.S. Cl. .................. 369/13; 360/114; 365/122
[58] Field of Search .................. 369/13; 360/114,59; 365/122

[56] References Cited

U.S. PATENT DOCUMENTS

| | | | |
|---|---|---|---|
| 4,694,358 | 9/1987 | Muchnik et al. | 360/59 |
| 4,794,560 | 12/1988 | Bell et al. | 369/13 |
| 4,878,132 | 10/1989 | Aratani et al. | 369/13 |
| 4,932,012 | 6/1990 | Kobayashi | 360/114 |
| 5,018,119 | 5/1991 | Aratani et al. | 369/13 |
| 5,168,482 | 12/1992 | Aratani et al. | 369/13 |
| 5,233,578 | 8/1993 | Yamamoto et al. | 369/13 |

FOREIGN PATENT DOCUMENTS 0318925  6/1989 European Pat. Off. .
62-188044  8/1987 Japan .................. 360/114

OTHER PUBLICATIONS

Gueugnon et al, "Computation of optical properties of multilayered media for magneto-optical memories", J. Appl. Phys. 57(1), 15 Apr. 1985, pp. 3891–3893.

Primary Examiner—Hoa T. Nguyen
Attorney, Agent, or Firm—Hill, Steadman & Simpson

[57] ABSTRACT

A magneto-optical playback method employing a magneto-optical recording medium having a playback magnetic layer, a recording magnetic layer, a transparent dielectric layer and a reflecting layer. The playback magnetic layer is so formed that its playback output $R \times \theta_k$ (in which R and $\theta_k$ represent the reflectivity and the Kerr rotation angle of the recording medium, respectively) is sufficiently small at any point lower than a threshold temperature $T_{th}$ at which the magnetization thereof is inverted. According to this method, a playback output is obtained by inverting the magnetization of merely the playback magnetic layer alone in a playback mode, thereby achieving ultrahigh-density recording with enhanced linear density (recording density on record tracks) and transverse-to-track density while improving the playback signal-to-noise ratio.

4 Claims, 4 Drawing Sheets

FIG. 1
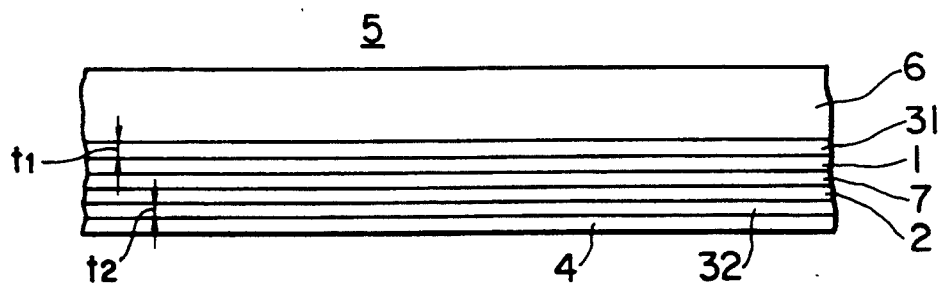
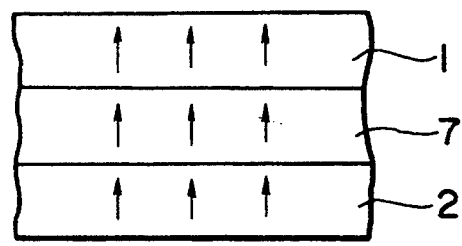
FIG. 2A
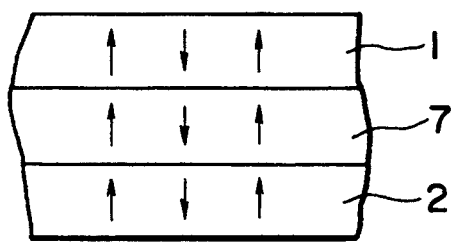
FIG. 2B
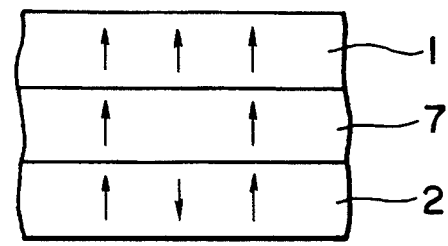
FIG. 2C

MAGNETO-OPTICAL PLAYBACK METHOD

This is a continuation of application Ser. No. 07/578,434, filed Sep. 7, 1990, now abandoned.

BACKGROUND OF THE INVENTION

1. Field of the Invention

The present invention relates to a magneto-optical playback method for reading out recorded information (magnetic domain) by utilizing the Kerr effect of magneto-optical recording interaction.

2. Description of the Prior Art

In a magneto-optical playback method which forms magnetic domains of recorded information bits in a magnetic layer of a magneto-optical recording medium and then irradiating the same with playback light such as semiconductor laser light to reproduce the recorded information by the magneto-optical interaction known as Kerr effect, it is necessary, for increasing the magneto-optical recording density, to shorten the bit length so as to dimensionally reduce the magnetic domains of information. In this case, the ordinary magneto-optical recording method known heretofore has such a disadvantage that, in ensuring a satisfactory signal-to-noise ratio during a playback mode, some restriction is unavoidable due to the laser wavelength of the playback light and the aperture of a lens.

Relative to the solution for the problem of a recording density restricted by the playback conditions, there is known an exemplary known technique of reproducing a signal from a recording medium, as disclosed in Japanese Patent Laid-open No. Hei 1 (1989)-14341 (corresponding to U.S. patent Ser. No. 07/278,011 filed Nov. 30, 1988, and European Patent Application laid open to public, EP A-0318925). In such reproducing method, recorded magnetic domains on a magnetic recording medium are extended by utilizing temperature rise derived from irradiation of laser light in a playback mode, to thereby achieve high-density signal reproduction beyond the aforementioned restriction relative to the recording density.

However, when such reproducing method is employed, there exists a problem with regard to improvement of the track density in the direction transverse to the tracks, although the linear density may be increased. More specifically, when the bit interval or the magnetic domain interval of recorded information bits is long, depending on the code data, extension of the magnetic domain in a playback mode is rendered great to consequently bring about another problem of crosstalk between the recorded magnetic domains on mutually adjacent tracks.

OBJECTS AND SUMMARY OF THE INVENTION

It is an object of the present invention to provide an improved magneto-optical playback method.

It is another object of the present invention to provide a magneto-optical playback method adapted for increasing both a linear recording density and a track density.

It is a further object of the present invention to provide a magneto-optical playback method adapted for eliminating crosstalk and realizing an improved signal-to-noise ratio.

According to one aspect of the present invention, there is provided a magneto-optical playback method for reproducing a signal from a magneto-optical recording medium by applying a playback laser light to such recording medium and detecting a reflected laser light therefrom. The recording medium comprises a magneto-optical playback layer, a magnetic recording layer both having perpendicular magnetization, and a transparent dielectric layer superposed on one another. The recording medium is so formed as to satisfy the condition that a playback output $R \times \theta k$ (where R stands for the reflectivity of the medium and $\theta k$ for the Kerr rotation angle thereof) is minimum at a temperature T1 lower than a threshold temperature $T_{th}$ which causes inversion of the magnetization of the magneto-optical playback layer, and a playback output is obtained by applying a playback laser light to the medium to invert the magnetization of the playback layer alone without inverting the magnetization of the recording layer. Inversion occurs when the sum of an external magnetic field and a demagnetizing field is greater than the coersive force of the playback layer at the temperature of the bit played back.

The above and other objects and features of the present invention will be apparent in detail from the following description which will be given with reference to the illustrative accompanying drawings.

BRIEF DESCRIPTION OF THE DRAWINGS

FIG. 1 is a schematic enlarged sectional view of an exemplary magnetic recording medium used in the method of the present invention;

FIGS. 2A–2C typically illustrates the states of magnetization for explaining how recording and playback are performed;

DESCRIPTION OF THE PREFERRED EMBODIMENTS

In the present invention, there is used a magneto-optical recording medium 5 having, as shown schematically in an enlarged sectional view of FIG. 1, a playback magnetic layer 1, a recording magnetic layer 2, transparent dielectric layers $3_1$ and $3_2$, and a reflecting layer 4. The playback magnetic layer 1 is so formed that its playback output $R \times \theta k$ (where R and $\theta k$ represent the reflectivity and the Kerr rotation angle of the medium, respectively) becomes sufficiently small at any point below a predetermined temperature $T_{th}$ at which the magnetization thereof is inverted. And in a playback mode, the magnetization of such playback magnetic layer 1 alone is inverted while reading light is irradiated to obtain a playback output by the Kerr rotation angle thereof.

Figure 6:
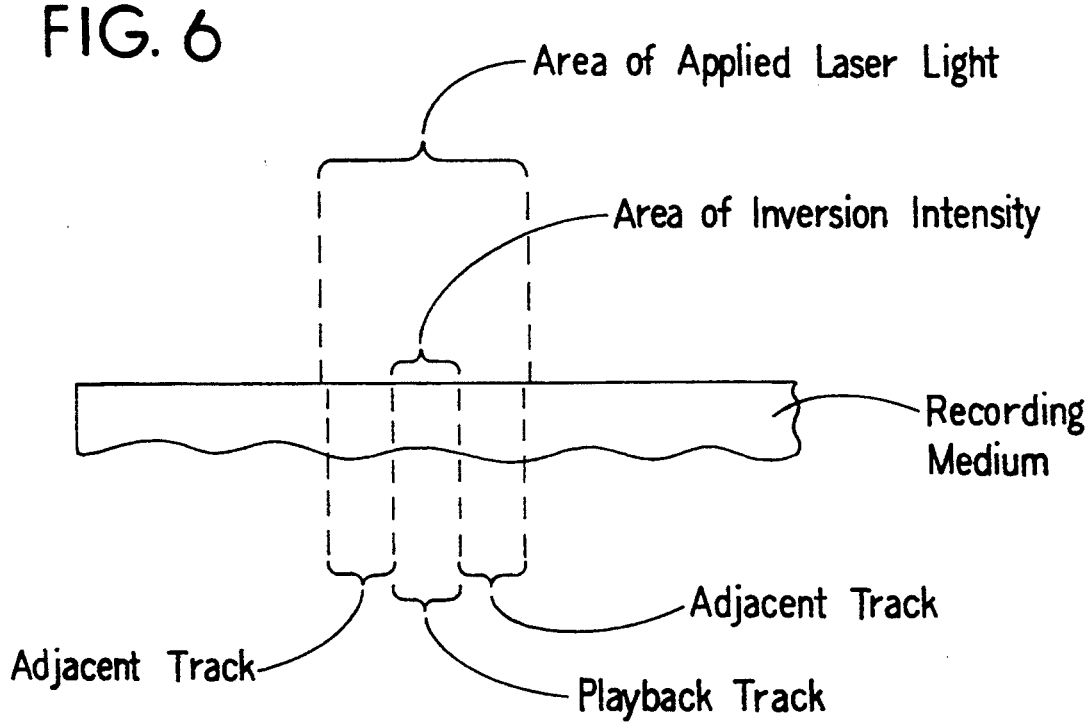
FIG. 6 illustrates the irradiation of a recording track and adjacent tracks with the playback laser beam.

As mentioned, in the method of the present invention, recorded information is reproduced by inverting, in a playback mode, the magnetization of the playback magnetic layer 1 alone. In this operation, although the magnetization of the playback magnetic layer is inverted while only a desired playback portion thereof is heated to be above the temperature $T_{th}$, the playback output ($R \times \theta k$) is sufficiently small in any other portion where the temperature is below the predetermined temperature $T_{th}$, so that the playback output from an adjacent track is rendered sufficiently small to consequently minimize the crosstalk. FIG. 6 indicates that the desired playback portion of a playback track is irradiated together with portions of adjacent tracks.

An exemplary magneto-optical recording medium used in the method of the present invention is schematically illustrated in an enlarged sectional view of FIG. 1. In this example, there are sequentially deposited, on a light transmissive base 6, a first transparent dielectric layer $3_1$, a playback magnetic layer 1, an intermediate layer 7, a recording magnetic layer 2, a second transparent dielectric layer $3_2$, a reflecting layer 4, and an unshown protective layer composed of an ultraviolet-ray setting resin. Denoted by 5 is a magneto-optical recording medium as a whole.

The light transmissive base 6 may be composed of a glass plate or a polycarbonate or similar resin plate which indicates a high transmissivity to recording/reproducing light such as semiconductor laser light used for such magneto-optical recording medium 5.

The first and second transparent dielectric layers $3_1$, $3_2$ may be composed of $Si_3N_4$, SiO, $SiO_2$, ZnS, $MgF_2$, SiAlON or AlN.

The playback magnetic layer 1 is composed of a selected magnetic material retaining a small coercive force $Hc_l$ in a single-layer state and having a Curie point $Tc_l$ higher than 200° C. for example with a great Kerr effect $\theta_k$. Meanwhile the recording magnetic layer 2 is composed of a selected magnetic material where micro magnetic domains can be recorded. Its perpendicular magnetic anisotropy is great so that the recorded magnetic domains are not varied in a playback mode, and its Curie point $Tc_2$ is higher than 200° C. for example.

The intermediate layer 7 is composed of a magnetic material so selected as to have a function of interrupting the switched connection between the playback magnetic layer 1 and the recording magnetic layer 2 at a predetermined temperature applied to a desired playback portion during the playback mode. In such magnetic material, the Curie point $Tc_3$ is in a range of 80° C. to 200° C. for example.

The reflecting layer 4 is composed of Al, Cu, Ag, Au or Pt.

Each of such layers $3_1$, 1, 7, 2, $3_2$ and 4 may be formed by the technique of evaporation, sputtering or the like.

FIGS. 2A–2C typically illustrate the states of magnetization with arrows in case the playback magnetic layer 1, the intermediate layer 7 and the recording magnetic layer 2 of the magneto-optical recording medium 5 are ferromagnetic. In the initial state of such magneto-optical recording medium 5, as illustrated in FIG. 2A, all of the playback magnetic layer 1, the intermediate layer 7 and the recording magnetic layer 2 are magnetized uniformly in the same direction (upward in this example). An operation of recording such magneto-optical recording medium 5 while forming magnetic domains therein can be performed by any of the known adequate recording methods based on light modulation, magnetic field modulation and so forth. More specifically, in a state where a bias magnetic field is applied in a direction reverse to the initial magnetization of the recording magnetic layer 2, recording light such as semi-conductor laser light is focused and irradiated after being modulated by a signal to be recorded. And in a portion of the recording magnetic layer 2 heated locally beyond the Curie point $Tc_2$ by such irradiation of the laser light, a value "1", for example, is recorded in a cooling state posterior to completion of scanning with the laser light, by the magnetization of which direction is determined by an external magnetic field and a stray magnetic field and is reverse to the direction in the initial state of the recording magnetic layer 2, as illustrated in FIG. 2B. In this case, due to the exchange coupling between the recording magnetic layer 2 and the intermediate layer 7 and also to the exchange coupling between the intermediate layer 7 and the playback magnetic layer 1, such three layers are magnetized uniformly in the same direction as the inverted magnetization of the recording magnetic layer 2. Thus, binary information recording with values "1" and "0" is performed in accordance with the presence and absence of information magnetic domains.

And in a playback mode for reading out the recorded information, laser light or the like is irradiated, and the Kerr rotation angle $\theta_k$ derived from the resultant magneto-optical interaction is detected to reproduce the information. Particularly in this case, the temperature in a desired playback portion is raised beyond the Curie point $Tc_3$ of the intermediate layer 7 which is higher than the predetermined temperature $T_{th}$, so that the exchange coupling between the recording magnetic layer 2 and the playback magnetic layer 1 is interrupted to thereby release the playback magnetic layer 1 from the magnetic restriction derived from the recording magnetic layer 2. As a result, there is exerted a required magnetic field which is the sum of the demagnetizing field applied to the playback magnetic layer 1 and the external magnetic field applied thereto in compliance with a requirement, whereby the magnetization of the playback layer 1 is inverted merely in, for example, a "1" recorded portion of the information recorded area as illustrated in FIG. 2C.

When an external magnetic field is applied, it needs to satisfy the condition that, at the playback temperature, the sum of the aforementioned demagnetizing field and the external magnetic field is greater than the coercive force $Hc_1$ of the playback magnetic layer 1 and is smaller than the coercive force $Hc_2$ of the recording magnetic layer 2.

Figure 3:
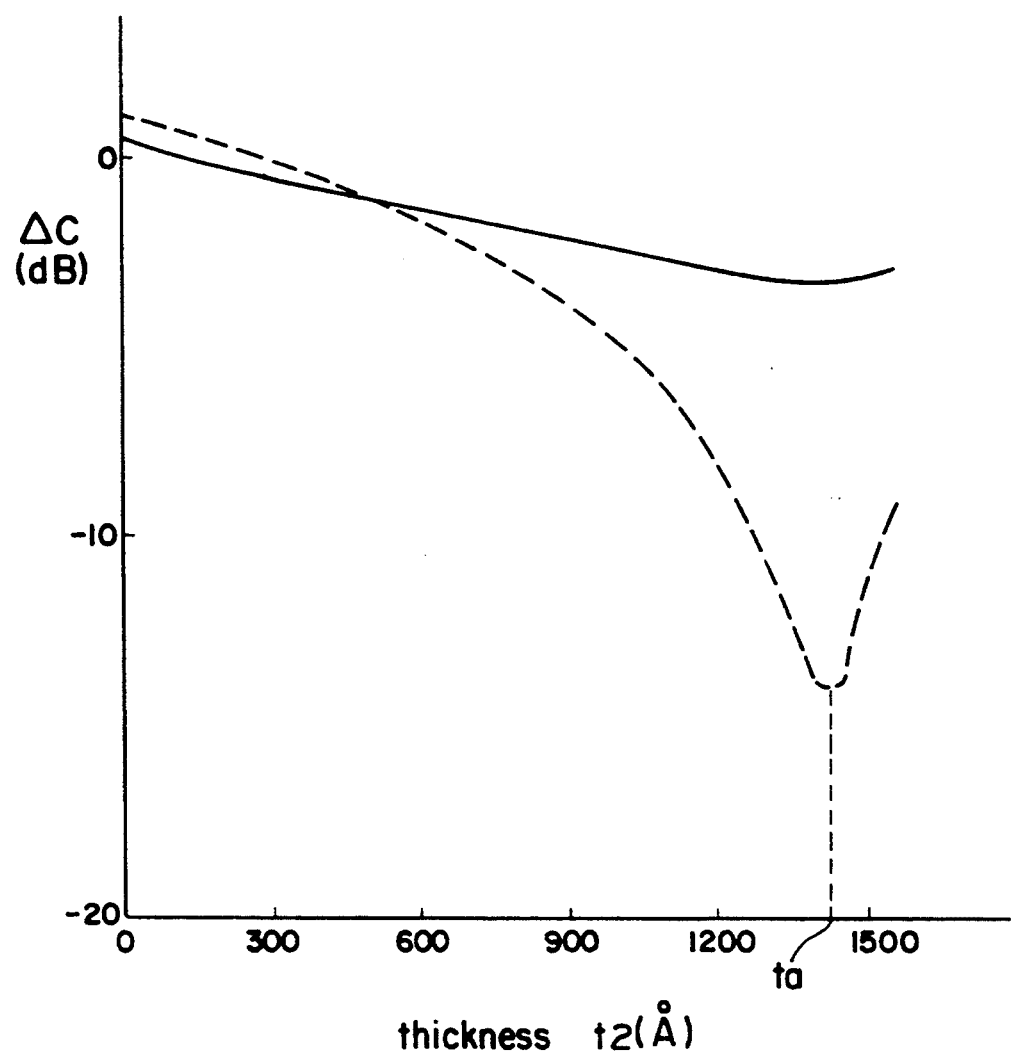
FIGS. 3 and 4 graphically show the dependency of a relative carrier level $\Delta C$ on the thickness of a dielectric layer.

In the present invention, particularly the magneto-optical recording medium 5 is dimensionally selected with regard to the thicknesses $t_1$ and $t_2$ of the first and second dielectric layers $3_1$ and $3_2$, the refractive indexes $n_1$ and $n_2$ thereof, and the thicknesses $h_1$, $h_2$ and $h_{12}$ of the magnetic layers 1, 2 and 7 so as to achieve enhancement of the Kerr effect in such a manner that the change $\theta_{k1}$ caused in the Kerr rotation angle as illustrated in FIG. 2C by the inversion of the magnetization of the playback magnetic layer 1 alone is rendered sufficiently great in comparison with the change $\theta_{k2}$ caused in the Kerr rotation angle by the inversion of the entire magnetization of the playback magnetic layer 1, the intermediate layer 7 and the recording magnetic layer 2 as illustrated in FIG. 3.

The materials of the playback magnetic layer 1, the intermediate layer 7 and the recording magnetic layer 2 are selected under the above-described conditions. The playback magnetic layer 1 may be composed of GdFeCo, NdFeCo, GdNdFeCo or PtCo; and the intermediate layer 7 may be composed of TbFe, DyFeCo or TbFeCo. Meanwhile the recording magnetic layer 2 may be composed of TbFeCo for example. Practically, when such magnetic layers are ferrimagnetic ones of rare earth-transition metals, the direction of an external bias magnetic field applied in a playback mode is selectively determined depending on whether such magnetic layers are transition-metal sublattice moment dominant films or rare-earth sublattice dominant films.

Embodiment 1

A magneto-optical recording medium 5 was produced by sequentially depositing, on a light permissive base 6 of polycarbonate, a first transparent dielectric layer $3_1$ of SiN having a refractive index of 2.0 and a thickness $t_1$ of 1000Å, then a playback layer 1 of GdFeCo having a thickness h1 of 220Å, subsequently an intermediate layer 7 of TbFe having a thickness $h_{12}$ of 50Å, thereafter a recording magnetic layer 2 of TbFeCo having a thickness $h_2$ of 220Å, further a second transparent dielectric layer $3_2$ of SiN having a refractive index of 2.0, and a reflecting layer 4 of Al having a thickness of 700Å. In such recording medium 5, the carrier level was measured while the thickness $t_2$ of the second transparent dielectric layer $3_2$ was changed. With regard to the carrier level C expressed as C=(reflectivity R×Kerr rotation angle $\theta$k), FIG. 3 graphically shows the relationship between the thickness $t_2$ of the second transparent dielectric layer $3_2$ and the carrier level difference AC obtained in comparison with a reference level determined in a case where the playback magnetic layer 1 is sufficiently thick and the recording magnetic layer 2 is not seen optically. In this example using semiconductor laser light of 780 nm in wavelength, a solid-line curve represents the state of FIG. 2C where the light is reflected merely from the playback magnetic layer 1 alone, and a broken-line curve represents the state of FIG. 2B where the magnetization of the second recording magnetic layer 2 is inverted similarly to the playback magnetic layer 1 and the intermediate layer 7.

Embodiment 2

Figure 4:
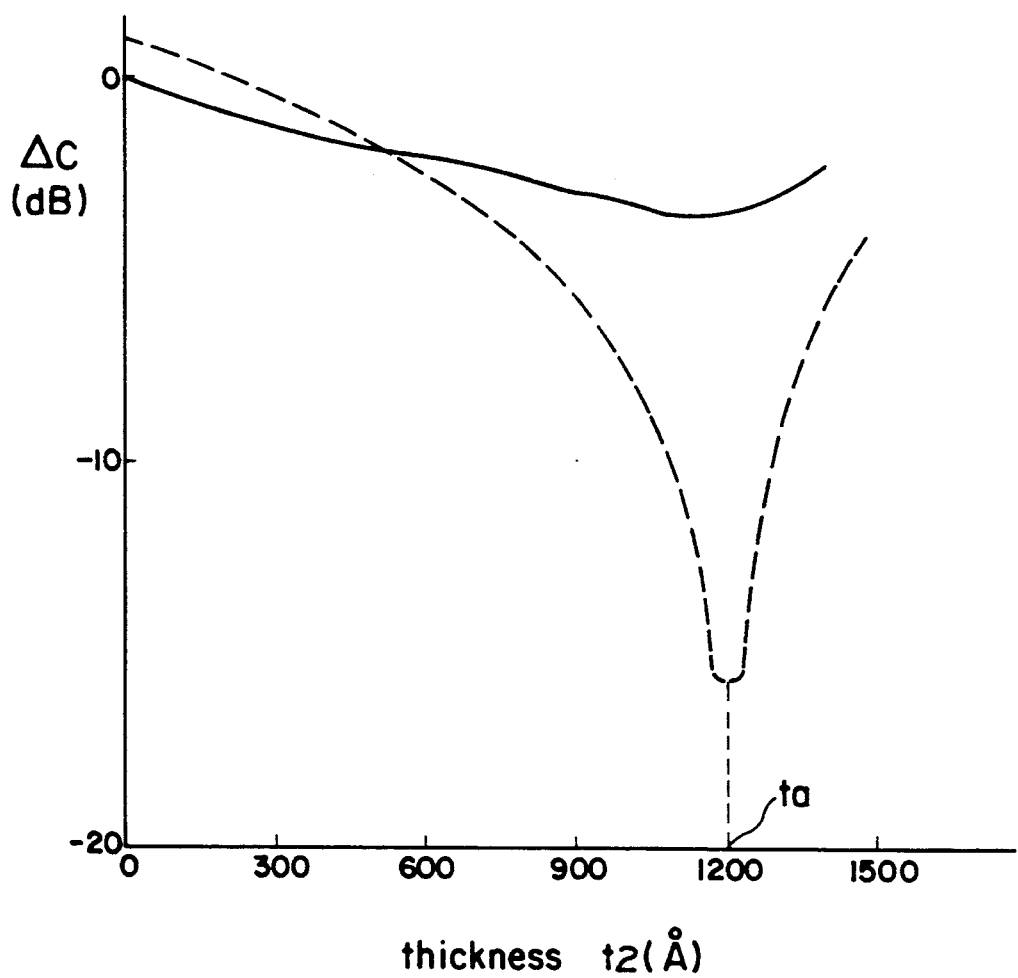

The structure is the same as that of Embodiment 1 with the exception that each of the first and second transparent dielectric layers $3_1$ and $3_2$ is composed of SiN having a refractive index of 2.2. FIG. 4 graphically shows the relationship between the thickness $t_2$ of the second transparent dielectric layer $3_2$ and the carrier level difference ΔC as in the foregoing case. In this example also, a solid-line curve represents the state of FIG. 2C, and a broken-line curve represents the state of FIG. 2B.

As is obvious from the above, if the thickness $t_2$ of the transparent dielectric layer $3_2$ is selectively set to a thickness $t_a$ plotted in FIGS. 3 and 4 or to the vicinity thereof, there is obtained a portion where the carrier level difference ΔC is small as represented by the broken-line curve in FIGS. 3 and 4, hence inducing a portion where the difference between the solid-line curve and the broken-line curve is great. Therefore, in the magneto-optical recording medium 5 where such Kerr enhancement effect is attained, it becomes possible to widen the carrier level difference between FIGS. 2B and 2C. Consequently, when playback light such as semiconductor laser light is irradiated in a playback mode to achieve a selected temperature distribution on the recording medium where the temperature in the adjacent track portion is not raised beyond the Curie point of the intermediate layer 7, then the desired objective track can be placed in the state of FIG. 2B while the track adjacent thereto can be placed in the state of FIG. 2C, whereby the carrier level difference is rendered increasable between the desired objective track and the adjacent track. Thus, the signal component contributing to the crosstalk is dependent merely on the small Kerr rotation angle variation $\theta_{k2}$, hence attaining a reduction of the crosstalk.

Embodiment 3

A magneto-optical disc (hereinafter referred to as disc D) was produced by sequentially depositing, on a base 6 of polycarbonate, a first transparent dielectric layer $3_1$ of SiN having a refractive index of 2.0 and a thickness $t_1$ of 1000Å, then a playback magnetic layer 1 of GdFeCo having a thickness $h_1$ of 200Å, subsequently an intermediate layer 7 of TbFe having a thickness $t_{12}$ of 50Å, thereafter a recording magnetic layer 2 of TbFeCo having a thickness $h_2$ of 200Å, further a second transparent dielectric layer $3_2$ of SiN having a refractive index of 2.0 and a thickness $t_2$ of a changed value, and a reflecting layer 4 of Al having a thickness of 700Å.

COMPARATIVE EXAMPLE 1

A magneto-optical disc (hereinafter referred to as disc Dc) was produced by sequentially depositing, on a base of polycarbonate, a first transparent dielectric layer $3_1$ of SiN having a refractive index of 2.0 and a thickness $t_1$ of 800Å, then a playback magnetic layer of GdFeCo having a thickness $h_1$ of 500Å, subsequently an intermediate layer 7 of TbFe having a thickness $h_{12}$ of 50Å, thereafter a recording magnetic layer 2 of TbFeCo having a thickness $h_2$ of 500Å, and a second transparent dielectric layer $3_2$ of SiN having a refractive index of 2.0 and a thickness $t_2$ of 800Å.

Figure 5:
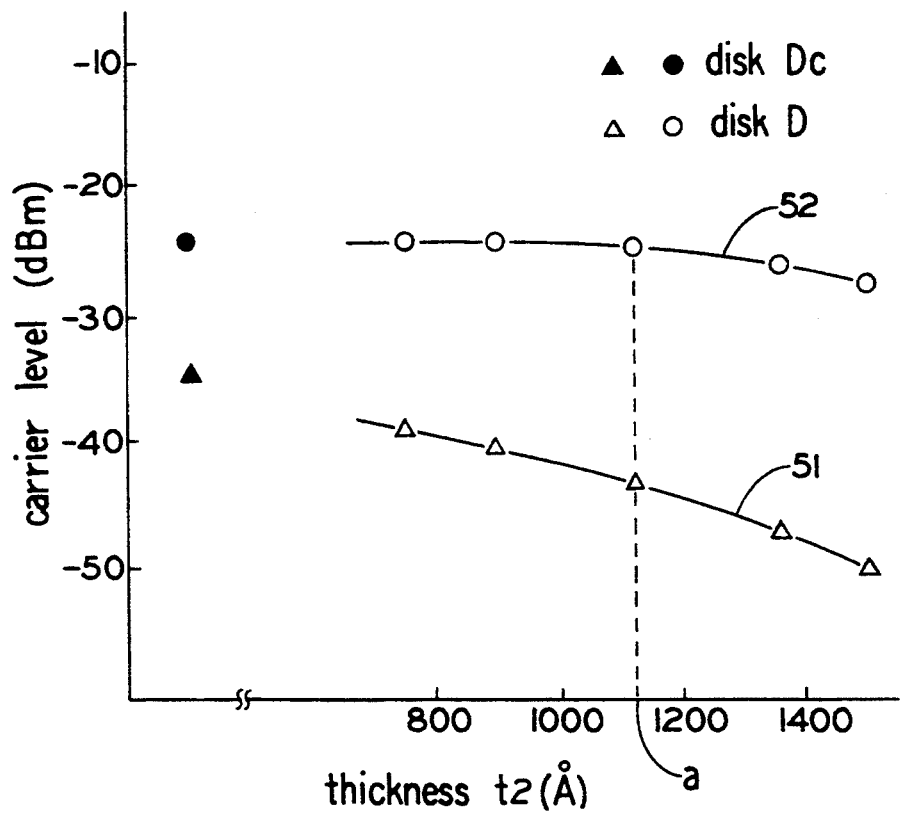
FIG. 5 graphically shows the carrier levels obtained in comparative examples and the method of the present invention.

With regard to such discs D and Dc, FIG. 5 graphically shows the relationship between the carrier level C ($\propto R \times \theta_k$) and the thickness of the second transparent dielectric layer $3_2$ with the results of measurements carried out by selected playback methods. Namely, in FIG. 5, signs o and ● denote the results obtained in reproducing the discs D and Dc respectively by the playback method of the present invention while inverting the magnetization of the playback magnetic layer 1 in each disc; and signs Δ and ▲ denote the results of measuring the carrier levels in the discs D and Dc respectively by an ordinary playback method which causes no inversion of the magnetization of the playback magnetic layer in each disc.

It is found that a preferred effect is achievable with respect to improvement of the crosstalk by setting the thickness $t_2$ to an adequate value which renders great the difference between the round and triangular signs representing the playback with inversion of the magnetization and the playback without such inversion, i.e., the difference between curves 51 and 52. However, the carrier level is lowered with an increase of the thickness $t_2$ as denoted by the curve 51. Therefore, in an attempt to avert a reduction of the playback output, it is preferred that the thickness $t_2$ be set to a value on the broken line a in FIG. 5, e.g., to a value on the order of 400Å. The measurement of the carrier level was performed under the conditions including a linear speed of 10 m/sec and a recording frequency of 10 MHz.

The crosstalk was measured in the discs D and Dc with the thickness $t_2$ of 1500Å under the measuring conditions including a track pitch of 0.8 μm, a wavelength of 780 nm, a recording frequency of 5 MHz, an adjacent-track recording frequency of 4.8 MHz, a linear speed of 10 m/sec, and an external magnetizing force of 500 Oe in a playback mode. Then a playback power of 2.2 to 2.6 mW was obtained with a crosstalk of −10 dB in the disc Dc reproduced with inversion of the magnetization of the playback magnetic layer. Meanwhile a playback power of 2.7 to 3.2 mW was obtained in the disc D, and it was confirmed that the crosstalk was reducible to −2.5 dB.

In the method of the present invention, as described hereinabove, a reading operation is performed by inverting the magnetization of merely the playback magnetic layer 1 alone in a playback mode. In such operation, only a desired playback portion is heated beyond the predetermined temperature $T_{th}$, and the magnetization of the playback magnetic layer at this portion is inverted. Therefore, at any portion below the threshold temperature $T_{th}$, its playback output $R \times \theta_k$ is rendered sufficiently small to consequently ensure a high carrier level-to-noise ratio while effectively averting the crosstalk between mutually adjacent tracks, hence attaining a high density even in the direction transverse to tracks. The adjacent tracks are part of a plurality of recording tracks provided adjacent to one another on the recording medium. During playback, the laser light is irradiated on a plurality of such recording tracks, including an objective track to be played back and neighboring tracks. The laser light has an intensity such as to heat the objective track to be played back adequate to invert the magnetization of the magneto-optical playback layer thereof, while heating the neighboring tracks less, so that the magnetization thereof is not inverted.

What is claimed is:

1. A magneto-optical playback method for playing back an information signal from a magneto-optical recording medium, comprising the steps of:

providing a recording medium comprising a magneto-optical playback layer and a magnetic recording layer, both having perpendicular magnetization, and a transparent dielectric layer, superposed on one another, said recording medium so formed as to satisfy the condition that a playback output R·Ok (where R stands for the reflectivity of said medium and Ok for the Kerr rotation angle thereof) is minimum at a temperature T1, lower than a threshold temperature $T_{th}$, which causes inversion of the magnetization of said playback layer, wherein said information signal has been recorded on said recording layer and has been transferred from the recording layer to the playback layer, during a recording process;

applying a playback laser light to said medium in the presence of an external magnetic field to selectively raise the temperature of said playback layer to above $T_{th}$, to selectively invert the magnetization of said playback layer alone without inverting the magnetization of said recording layer, detecting a reflected laser light therefrom to obtain a playback output; and deriving an output signal corresponding to said playback output in response to the inversion state of said playback layer.

2. A method according to claim 1, wherein said recording medium has a plurality of recording tracks provided adjacently to one another, and including the step of irradiating a plurality of such recording tracks with said playback laser light including an objective track to be played back and neighboring tracks, said laser light having an intensity adequate to invert the magnetization of said magneto-optical playback layer on said objective track while holding the magnetization of said neighboring tracks.

3. A magneto-optical playback method, comprising the steps of:

providing a recording medium comprising a magneto-optical playback layer and a magnetic recording layer, both having perpendicular magnetization direction, and a transparent dielectric layer superposed on one another, said playback layer so formed as to satisfy the condition that a playback output R· Ok (where R stands for the reflectivity of said medium and Ok for the Kerr rotation angle thereof) is minimum at a temperature T1 lower than a threshold temperature Tth which causes inversion of the magnetization of said playback layer, said information signal having been transferred from the recording layer to the playback layer, during a recording, said recording medium further comprising an intermediate magnetic layer located between said playback layer and said recording layer, said intermediate layer having a Curie temperature Tc3 higher than said threshold temperature Tth and magnetically coupled, during the recording on said recording layer, to both said playback layer and recording layer at a temperature lower than said Curie temperature Tc3;

applying a playback laser light to said medium in the presence of an external magnetic field to selectively raise the temperature of said playback layer to above threshold temperature Tth, to a temperature of about said temperature Tc3, to selectively invert the magnetization of said playback layer alone without inverting the magnetization of said recording layer;

detecting a reflected laser light from the recording medium to obtain a playback output;

deriving an output signal corresponding to said playback output in response to the inverted magnetization of said playback layer.

4. A magneto-optical playback method for playing back an information signal from a magneto-optical recording medium, comprising the steps of:

providing a recording medium comprising a magneto-optical playback layer and magnetic recording layer, both having perpendicular magnetization, and a transparent dielectric layer superposed on one another, the recording medium having a plurality of information tracks, said playback layer is so formed as to satisfy the condition that a playback output R·Ok (where R stands for the reflectivity of said medium Ok for Kerr rotation angle thereof) is minimum at a temperature T1 lower than a threshold temperature Tth which causes inversion of the magnetization of said playback layer, wherein said information signal has been recorded on said recording layer and has been transferred from the recording layer to the playback layer during a recording process;

applying a playback laser light to said medium in the presence of an external magnetic field to selectively raise the temperature of said playback layer to above Tth, to selectively invert the magnetization of said playback layer alone without inverting the magnetization of said recording layer, wherein said laser light is applied to an area including a portion of an objective track subjected for playing back recorded information, to raise the temperature of said portion to about the temperature Tth to cause said inversion of the magnetization of the playback layer, while said laser light is simultaneously applied to a portion of an adjacent track, said portion is heated to a temperature below said predetermined temperature Tth;

detecting a reflected laser light therefrom to obtain a playback output; and deriving an output signal corresponding to said playback output in response to the inversion state of said playback layer in said objective track, a contribution to said output signal as a result of an information signal recorded on said adjacent track being substantially smaller than the contribution to output signal from said objective track.

* * * * *